(12) United States Patent
Yeung et al.

(10) Patent No.: US 9,919,969 B2
(45) Date of Patent: Mar. 20, 2018

(54) COATED BUILDING PANELS AND ARTICLES CONTAINING CALCIUM SULFATE HEMIHYDRATE

(71) Applicant: United States Gypsum Company, Chicago, IL (US)

(72) Inventors: Lee K. Yeung, Vernon Hills, IL (US); Jeffrey F. Grussing, Trevor, WI (US); Christopher J. Borovka, Grayslake, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/243,331

(22) Filed: Aug. 22, 2016

(65) Prior Publication Data

US 2016/0355438 A1    Dec. 8, 2016

Related U.S. Application Data

(62) Division of application No. 12/107,396, filed on Apr. 22, 2008.

(51) Int. Cl.

| | |
|---|---|
| C04B 28/14 | (2006.01) |
| C04B 26/06 | (2006.01) |
| C09D 5/28 | (2006.01) |
| C09D 7/02 | (2006.01) |
| C09D 7/12 | (2006.01) |
| E04C 2/04 | (2006.01) |
| C09D 5/34 | (2006.01) |
| C04B 24/02 | (2006.01) |
| C09D 131/04 | (2006.01) |
| E04F 13/04 | (2006.01) |
| C04B 103/00 | (2006.01) |
| C04B 111/00 | (2006.01) |
| C04B 111/20 | (2006.01) |
| C08K 3/30 | (2006.01) |

(52) U.S. Cl.
CPC .............. *C04B 28/14* (2013.01); *C04B 24/02* (2013.01); *C04B 26/06* (2013.01); *C04B 28/145* (2013.01); *C09D 5/28* (2013.01); *C09D 5/34* (2013.01); *C09D 7/02* (2013.01); *C09D 7/1216* (2013.01); *C09D 7/1233* (2013.01); *C09D 131/04* (2013.01); *E04C 2/043* (2013.01); *E04F 13/04* (2013.01); *C04B 2103/0082* (2013.01); *C04B 2103/0083* (2013.01); *C04B 2111/0062* (2013.01); *C04B 2111/00491* (2013.01); *C04B 2111/29* (2013.01); *C08K 3/30* (2013.01); *Y10T 428/31855* (2015.04)

(58) Field of Classification Search
None
See application file for complete search history.

(56) References Cited

U.S. PATENT DOCUMENTS

| | | |
|---|---|---|
| 3,159,640 A | 12/1964 | McClure et al. |
| 3,854,985 A | 12/1974 | Suzuki et al. |
| 3,935,021 A | 1/1976 | Greve et al. |
| RE29,753 E | 9/1978 | Williams |
| 4,155,887 A | 5/1979 | Hetson |
| 4,157,264 A | 6/1979 | Kennedy-Skipton |
| 4,265,964 A | 5/1981 | Burkhart |
| 4,472,540 A | 9/1984 | Barker |
| 4,661,161 A | 4/1987 | Jakacki et al. |
| 4,849,018 A | 7/1989 | Babcock et al. |
| 4,876,142 A | 10/1989 | Piccirillo |
| 4,904,709 A | 2/1990 | Hermele |
| 4,927,463 A | 5/1990 | Kloetzer et al. |
| 5,059,456 A | 10/1991 | Larson et al. |
| 5,191,049 A | 3/1993 | Enomoto et al. |
| 5,437,722 A | 8/1995 | Borenstein |
| 5,633,310 A | 5/1997 | Sulser et al. |
| 5,746,822 A * | 5/1998 | Espinoza .............. C04B 22/142 106/785 |
| 5,779,786 A * | 7/1998 | Patel ................... C04B 24/2652 106/778 |
| 5,879,446 A | 3/1999 | Patel et al. |
| 5,879,825 A | 3/1999 | Burke et al. |
| 6,187,887 B1 | 2/2001 | Albrecht et al. |
| 6,299,679 B1 | 10/2001 | Montoya |
| 6,319,312 B1 | 11/2001 | Luongo |
| 6,342,284 B1 | 1/2002 | Yu et al. |
| 6,379,458 B1 * | 4/2002 | Immordino ......... C04B 20/1022 106/772 |
| 6,402,832 B1 | 6/2002 | Vijayendran et al. |
| 6,548,589 B2 | 4/2003 | Widmer et al. |
| 6,645,291 B2 | 11/2003 | Ayambem et al. |
| 6,663,979 B2 | 12/2003 | Deodhar et al. |
| 6,686,044 B2 | 2/2004 | Nakai et al. |
| 6,689,200 B2 | 2/2004 | Scarborough et al. |
| 6,800,311 B2 | 10/2004 | Villwock |
| 6,805,741 B1 | 10/2004 | Liu et al. |
| 6,998,430 B2 | 2/2006 | Tanaski |
| 7,244,304 B2 | 7/2007 | Yu et al. |
| 2002/0038618 A1 | 4/2002 | Ayambem et al. |
| 2003/0113572 A1 | 6/2003 | Deodhar et al. |
| 2003/0118803 A1 | 6/2003 | Veeramasuneni et al. |

(Continued)

FOREIGN PATENT DOCUMENTS

| | | |
|---|---|---|
| EP | 1064236 | 1/2001 |
| GB | 2426522 | 11/2006 |

(Continued)

OTHER PUBLICATIONS

Hawley's Condensed Chemical Dictionary, 14th edition, John Wiley & Sons, Inc., 2002, gypsum definition.

*Primary Examiner* — Nathan T Leong
(74) *Attorney, Agent, or Firm* — Greer, Burns & Crain, Ltd.; Pradip Sahu; Philip T. Petti

(57) ABSTRACT

A method of finishing an interior wall includes the steps of preparing a substrate of building panels comprising gypsum, cement or combinations thereof, said substrate having a surface, followed by applying a coating to the substrate, said coating comprising 1-30% by weight of a latex emulsion binder, 30-80% by weight calcium sulfate hemihydrate, up to about 8% by weight of a set inhibiting agent and 20-60% by weight water.

7 Claims, No Drawings

(56) References Cited

U.S. PATENT DOCUMENTS

| | | |
|---|---|---|
| 2005/0229519 A1 | 10/2005 | Colbert et al. |
| 2006/0130708 A1 | 6/2006 | Calva Garcia et al. |
| 2006/0211805 A1 | 9/2006 | Willimann et al. |
| 2007/0044687 A1 | 3/2007 | Blackburn et al. |
| 2007/0227405 A1 | 10/2007 | Yu et al. |

FOREIGN PATENT DOCUMENTS

| | | |
|---|---|---|
| JP | 08-060139 | 3/1996 |
| KR | 2005-0072460 | 7/2005 |

\* cited by examiner

COATED BUILDING PANELS AND ARTICLES CONTAINING CALCIUM SULFATE HEMIHYDRATE

CROSS REFERENCE TO RELATED APPLICATION

This application is a divisional patent application of U.S. patent application Ser. No. 12/107,396, filed Apr. 22, 2008.

BACKGROUND

This invention relates to a calcium sulfate hemihydrate composition and method for using it. Further, it relates to a universal primer that can be used on new or previously painted gypsum panels, cement panels or the like to prepare the surface for either plastering, painting or other form of surface decorative finish.

Interior walls are typically made of gypsum panels, such as SHEETROCK® brand gypsum panels, cement panels or the like. While the use of panels allows large areas of wall to be created quickly, seams between the panels must be finished to make a monolithic surface that is ready to receive paint or another decorative finish. Whether new walls are being constructed or old walls resurfaced, a great deal of time is necessary to prepare the walls for paint, plaster or other decorative finishes.

Finishing of new panels is a time consuming process. After the boards are hung, a coat of joint compound is applied to the seams and the nail heads. The joint compound is allowed to dry overnight, then is sanded when completely dry. Dust from sanding is removed with a tack cloth or damp sponge. If the joint compound shrinks, a second coat of joint compound is applied and allowed to dry overnight followed by sanding and dedusting of the surface. For a quality job, the process is repeated with a third coat of joint compound. Finishing of the surface takes at least three days, even after the boards are hung. This process can also be used to repair damaged walls.

Although this process takes time, it produces a smooth, monolithic surface at a low cost. It is a relatively simple process and can often be done by a homeowner without professional assistance. But there are drawbacks in the amount of time needed to complete such a job. In new construction, installation of cabinets, carpet, fixtures and other finishing items is held up while waiting for the finishing to be completed. Workmen have to keep returning to the same job site several days in a row.

For a homeowner doing repairs or redecorating, disruption of the home is prolonged. Repeated sanding of the surface generates fine dust that permeates closets and cabinets, requiring a thorough dusting throughout the home. A quicker and cleaner method of refinishing old walls would be desired by both contractors and homeowners.

In place of going through this long process, some homeowners choose to apply a veneer coat of plaster over the entire wall. After plastering over the seams, fasteners and other imperfections, the wall is covered with plaster by a skilled craftsman. This technique results in a stronger surface that is less likely to chip, dent, scratch or incur nail pops than finishing using a joint compound. Additionally, no sanding is necessary to smooth the imperfections of the plaster because of the densification step inherent to the plastering process. By not having to sand, the homeowner is spared the mess and time needed to clean up the dust that would be generated by using joint compound. Finally, the veneer plaster can be completed in one day, compared to two to three days for joint compound work. Thus, the job is completed more quickly. Use of colorized plaster can even eliminate the need for painting of the plastered surface. A disadvantage of this technique is that the veneer plaster must be applied by a skilled crew, driving up the cost. It would be very difficult for a typical homeowner to apply a veneer plaster coat with good results.

Wallboard is available that is designed for use with plaster, such as IMPERIAL® brand gypsum board by United States Gypsum Co., Chicago, Ill. This wallboard has properties to ensure plaster integrity and additives in the paper that allow it to maintain strength even after absorbing water from the plaster application. However, these special building panels may not be available everywhere, or the homeowner may decide to use a plaster finish after conventional building panels have been installed. In these cases it would be advantageous to have a coating or primer available that would allow application of a veneer plaster coating to a conventional building panel.

Resurfacing of old, damaged walls also requires several steps. New plaster, for example, cannot be applied directly to old plaster as it will not adhere. The surface is roughed up, as by sanding, to expose an absorbent surface or badly damaged portions may have to be removed. Next, a bonding agent is applied to bond the plaster layers together. A base coat of plaster is then applied, followed by a thin plaster coat. After drying, the finish plaster coat is applied. At least three layers of material are applied prior to the final finish plaster coating. Resurfacing of old plaster would be easier if a primer were available that would reduce the number of plaster coats and the amount of material that have to be applied during remodeling. Further, some homeowners would like to have the option to paint old walls that have previously been plastered or plaster old walls that had been painted. To allow this to happen, a primer is needed that would adhere to both paint and to plaster. The prior art has not considered primers having the ability to bond to plaster as well as other wall finishes. In U.S. Pat. No. 4,661,161, a ready-mixed, setting-type joint compounds was formulated using calcium sulfate hemihydrate as the binder. A set retarder was added to the wet paste to stop the hemihydrate from hydrating to the dihydrate form. Hydration was intended to be initiated by the addition of a set accelerator just prior to use of the joint compound. However, it was found that the set retarder degraded over time, allowing hydration to occur during the shelf-life of the product.

Thus there is a need in the art for a composition, such as a primer, that bonds to a number of different surfaces and can be used for a number of different applications.

SUMMARY

These and other problems are improved by the present invention which is a multi-purpose primer that allows adhesion of paint or plaster to conventional building panels whether the panels are new, painted, previously wallpapered or plastered. More specifically, at least one embodiment is a method of preparing an interior wall for a finish coating such as plaster, paint or other decorative compositions. The method includes the steps of preparing a substrate of building panels comprising gypsum, cement or combinations thereof, said substrate having a surface, and applying a coating to the substrate, said coating comprising 1-30% by weight of a latex emulsion binder, 30-80% by weight calcium sulfate hemihydrate, up to about 8% by weight of a set inhibiting agent and 20-60% by weight water.

The coating of this invention is a ready-mixed composition for application to building panels that has the ability to act as a multi-purpose primer. It can be used to prepare either new construction panels or to resurface old walls in need of repair. This primer composition is useful whether the wall is being prepared to receive paint, plaster or any other decorative composition.

Finishing a wall by applying a veneer plaster coating is faster than taping, applying joint compound, and sanding, which requires waiting up to 24 hours between coats so that the joint compound dries sufficiently for the application of the next coat. When utilizing the present composition, a veneer plaster can be applied, followed by a second coat within the same day. At least one, and often two, days can be saved by this method.

Use of the primer composition of this invention opens a number of options that previously required removing drywall or other building panels already in place. Application of veneer plaster can now be applied to new walls where conventional building panels have been installed or where special panels for use with plaster are not available. Remodeling work where conventional panels were previously painted or wallpapered can be plastered using the primer composition of this invention.

Use of this coating mixture also saves materials, particularly where a new coat of veneer plaster is applied to a previously plastered wall. Fewer coats of plaster and material are required to coat the wall with a veneer coating compared to conventional methods of refinishing a previously plastered surface. At least one less coating of plaster is needed to produce a finished quality, monolithic surface.

DETAILED DESCRIPTION

A substrate is prepared of panels comprising gypsum, cement or combinations thereof. For the purposes of this invention, preparing the substrate includes any method of making a substrate ready to receive a coating prepared from a coating mixture. In new construction, preparing the substrate includes attaching the panels to studs or another frame that is used to support a wall and/or ceiling.

The panels include a core with an optional facing on one or both of the major surfaces. Preferably the panels are made of gypsum, such as SHEETROCK® brand gypsum panels by United States Gypsum Co. The panels are made in a continuous, high-speed process in which a paper facing is laid down on a conveyor. A slurry of calcium sulfate hemihydrate or calcined gypsum, water and additives is poured onto the paper and topped with a second facing to make a "sandwich." The gypsum slurry is distributed across the width of the sandwich and formed to a constant thickness, then allowed to set and harden. When the slurry is about 50% hydrated, the boards are cut to an appropriate length and moved to a kiln to finish drying. A particularly preferred gypsum building panel for use with plaster is an IMPERIAL® gypsum panel by United States Gypsum Co. (Chicago, Ill.).

The calcium sulfate hemihydrate can be any type or mixtures of different types. An alpha form is available by calcining gypsum under pressure, making it expensive relative to the beta form. Gypsum calcined at atmospheric pressure is the beta-calcined form. Beta-calcined gypsum has more amorphous or plate-like crystal morphology compared with the alpha form. Since the alpha form is less amorphous, it flows more easily when dispersed in a slurry, requiring less water than the beta form for equivalent flowability.

Cement panels, such as DUROCK® brand cement panels, are made by pouring a slurry of cement, water and additives onto a scrim or mesh facing material. Prior to full set, the panels are cut to size and moved to a kiln to accelerate the drying process. Cement panels are useful in basements, bathrooms or anywhere where water is likely to be present. The use of panels made of a mixture of cement and calcined gypsum is also contemplated.

The facing is made from any material to which the coating mixture will adhere and that provides strength to the panel. Suitable facings include paper, cardboard, fiberglass, plastic, scrim or mesh facings, or any facing as is known in the art. The use of panels with no facing is contemplated.

The substrate surface is made by attaching the panels to a framework of studs that form the support for a wall or ceiling. Adjacent panels are abutted against each other, making the joint between the panels as small as practical. The joints are then taped over forming a monolithic surface. The panels can be cut to accommodate the size or shape of a particular wall or ceiling and are attached by any known means of doing so. Generally, the panels are attached by means of nails or screws. In attaching the panels, the nails or screws should be driven into the panel sufficiently deep that none of the head is visible above the substrate surface. Each nail or screw should be flush with the surface.

Preparation of the surface also includes steps to finish a previously decorated surface for repair. The exact type of preparation depends upon the nature of the repair to be effected. If all or a part of one or more panels is replaced, preparation includes attaching of the new panels or portions thereof.

The coating mixture that forms the coating includes a latex emulsion polymer as a binder. Some embodiments of the coating mixture use a latex emulsion polymer is made from monomers including vinyl acrylates, vinyl acetates, vinyl chlorides, ethylenes and substituted ethylenes. Polyurethane and polyester emulsions are also useful. Poly vinyl acetate is suitable when the coating mixture is to be applied to gypsum panels, but may have applicability to other substrates as well. The exact type and amount of latex emulsion polymer added depends on the surface to which it is applied. Larger doses of the adhesive are more suitable for use with less porous substrates.

Preferably, the latex emulsion polymer has a molecular weight of more than 10,000 Daltons. In some embodiments, amounts of the latex emulsion range from about 1% to about 30% or from about 10% to about 40% by weight based on the weight of the total mixture components. Examples of suitable latex emulsions include AIRFLEX® 4530 Vinyl acetate copolymer emulsion, AC 1265 polyvinyl acetate homopolymer emulsion, HP 19-176 polyvinyl acetate copolymer emulsion and HP 41-830 vinyl acetate emulsion available from Halltech Inc. (Ontario, Canada) VF-812 methacrylic latex polymer available from Engineered Polymer Solutions of Marengo, Ill.

Another component of the coating mixture is calcium sulfate hemihydrate. Any type of calcium sulfate hemihydrate is useful in this coating mixture as described above with respect to the building panels. When the coating mixture is applied to gypsum-based building panels, the calcium sulfate hemihydrate used is optionally the same as that used in the building panel or it may be a different type. Many embodiments of the coating mixture utilize beta-calcined calcium sulfate hemihydrate.

A set inhibiting agent is added to the coating mixture to prevent hydration and set of the calcium sulfate hemihydrate. The addition of the set inhibiting agent allows the coating mixture to be prepared as a ready-mixed product, eliminating the need to add water and/or additional chemicals at the job site. Any set inhibiting agent known to indefinitely retard set of the calcium sulfate hemihydrate for the shelf life of the product can be used. The total amount of set inhibitor is up to 8% by weight. Amounts of set inhibitor of from about 0.05% to about 2% are also useful.

At least some embodiments of the coating mixture use a combination of low molecular weight polymers and small molecules as a dual-component set inhibiting agent. Both portions of the dual-component set inhibiting agent have an affinity to calcium ions and calcium sulfate crystal lattices. These two additives act cooperatively to indefinitely deactivate the set mechanism of the calcium sulfate slurry. This provides a long shelf-life for the packaged plaster product, yet it is ready to use at the job without the addition of extra components such as water or a set accelerator.

The low molecular weight polymer preferably has a molecular weight of from about 2,000 Daltons to about 6,000 Daltons. Some embodiments of the low molecular weight polymer are made from monomers including vinyl acrylates, vinyl acetates, vinyl chlorides, ethylenes, styrenes, substituted styrenes and substituted ethylenes. Polymers having a polyamide backbone or carboxylate functional groups are also useful. The amount of the low molecular weight polymer is up to about 8% or from about 0.05% to about 2% by weight based on the total weight of the coating mixture. ALCOQUEST® 408 and ALCOQUEST® 747 (Alco Chemical, Chattanooga, Tenn.) are liquid solutions of polyacrylate and modified polycarboxylate polymers respectively having a molecular weight of about 3000. These polymers are particularly well suited for use in the coating mixture composition.

The small molecules that are part of the preferred set inhibiting agent include any of a number of small molecules. Some small molecules that are useful include polyphosphonic compounds including, but not limited to, tetrasodiumpyrophosphate, tetrapotassiumpyrophosphate, animotri(methylene-phosphonic acid), diethylenetriamine penta (methylene phosphonic acid)trisodium salt, hexamethylene diamine tetra(methylene phosphonic acid), tetrapotassiumpyrophosphate and mixtures thereof. The amount of the small molecule used in the coating mixture is up to about 8% or from about 0.1% to about 2% based on the total weight of the components. An example of a suitable small molecule is tetrapotassium pyrophosphate HP (Astaris, Cateret, N.J.).

Water is optionally added to the mixture at the job site. The exact amount of water added depends on the desired thickness of the coating. It is possible to prepare the coating mixture to have a consistency of either a paste or paint. It is preferred that water be added in the amount of at least 20% the weight of the components. For thinner compositions, up to 70% of the weight of the components can be added as water. The water should be as clean as practical to reduce the opportunity for unwanted chemical reactions, biological spoilage or mixture destabilization.

Optionally, a biocide is added to prevent mold and bacterial growth of the composition during its shelf life. The amount of biocide will partially depend on the exact biocide selected, however, some biocides are present in amounts of 0.08% to about 0.5% by weight based on the weight of the coating mixture. Suitable biocides include sodium OMADINE® or zinc OMADINE®, manufactured by Arch Chemicals, Inc. of Norwalk, Conn., or made according to the process of U.S. Pat. No. 3,159,640, herein incorporated by reference.

To increase the amount of open time and freeze-thaw stability, a glycol component is added. The glycol component includes propylene glycol, ethylene glycol, polyethylene glycol and methoxypolypropylene glycol and mixtures thereof. The glycol component is used in amounts of about 1 to about 10% based on the total weight of the coating mixture. Molecular weight of the glycol component is preferably between 250 and 4000 Daltons.

Ethylene glycol is also optionally added for freeze-thaw stability. When used for this purpose, the ethylene glycol is added in amounts of about 1% to about 5% based on the weight of the composition, and independent of any water retainer present.

The organic water retainer reduces water separation and bleed during the shelf life of the product. It also holds moisture while the product is being applied, giving it a longer open time and more slip. Any water retainers as are known for use with gypsum or cement slurries can be used in this mixture. Some embodiments of the mixture include starch or polyacrylamides as water retainers. Amounts of water retainers include from about 1% to about 10% based on the total weight of the coating mixture.

Another optional component of the mixture is an antisedimentation additive. From about 0.05% to about 1% by weight of this additive is used, based on the total weight of the coating mixture. The antisedimentation additive reduces bleed off of the liquid as well as sedimentation of the solids. Preferred antisedimentation additives include modified clay, such as modified smectite clays, silicates such as modified hydrous sodium lithium magnesium silicates, and mixtures thereof.

Thickeners are optionally added to the coating mixture to control the flow rheology of the material. Thickeners are optionally added in amounts of 0.05% to 8% by weight of the primer composition. The thickeners modify the rheology of the coating composition for ease of application or to increase coverage. Examples of thickeners include modified cellulose such as the BERMOCOLL® products (Akzo Nobel, Stenungsund, Sweden) and the CELLOSIZE® Hydroxyethyl Cellulose products (Dow Chemical, Midland, Mich.)

Optionally, light texturing materials such as sand, calcium carbonate, expanded perlite, calcium sulfate dihydrate, synthetic ceramic spheres, synthetic silicate-based spheres and cellulosic fibers are added to the composition to roughen the surface to provide better mechanical adhesion of the plaster to the primer as well as provide a certain amount of water absorption property for plastering. The amount of the light texturing material used in the mixture ranges from 1-20% based on the total weight of the components. The mean diameter of the particles is preferably between 30 and 160 mesh.

Preparation of the coating mixture includes assembling the dry components and mixing them to form a homogeneous dry mix. Assembling of the components includes gathering, the calcium sulfate hemihydrate and lightweight texturing component as dry ingredients and dry blending them to make a composite dry mix. The optional modified smectite clay or phyllo layered silicate clay is also included in the dry mixture. Dry ingredients are added to the dry mix in no particular order. Any method of dry blending the dry mix can be used, including stirring, mixing or tumbling the dry components. In all cases, mixing continues until a homogeneous dry mix is obtained.

A liquid blend is prepared by dissolving the dual-component set inhibitor in water. Thus, the low molecular weight polymer, the small molecules and the optional biocide are added to the water and fully dissolved. The dry mixture is added slowly to the aqueous component while mixing. Finally, the glycol component and latex emulsion polymer are added with mixing. In some embodiments the material is mixed at 60 rpm until lumps are no longer visually discernable, usually 15-20 minutes.

Other embodiments of the coating mixture have a biocide for long shelf life. Low molecular weight polyacrylate containing polymer (0.05-2.0%), polyphosphonic compound (0.1-2.0%) and the biocide/fungicide package (0.08-0.5%) are added to water (20-60%) and fully dissolved with stirring at around 60 rpm. The glycol component (1-10%) and latex emulsion (5-30%) are then added with mixing at 60 rpm for 1-2 minutes. Finally, calcium sulfate hemihydrate (30-80%) is dry blended with optional light texturing material (1-20%) or modified smectite clay or phyllo layered silicate clay (0.05-1%) for 5 minutes to form a dry mixture. The dry-mixed charge is added slowly to the aqueous component while mixing at 60 rpm or below. The coating mixture is mixed at 60 rpm until lumps are no longer visually discernable, usually 15-20 minutes.

Still other embodiments of the coating mixture are made by combining polyphosphonic compound (0.1-2.0%) and the biocide/fungicide package (0.08-0.5%) are added to water (20-60%) and fully dissolved with stirring at around 60 rpm. Calcium sulfate hemihydrate (30-80%) is dry blended with the low molecular weight polyacrylate containing polymer (0.05-2.0%) and optionally, any combination of modified smectite clay or phyllo layered silicate clay (0.05-1%) for 5 minutes. The dry mixture is added slowly to the aqueous component while mixing at 60 rpm or below. Finally, the glycol component (1-10%) and latex emulsion (5-30%) are added with mixing at 60 rpm. The material is mixed at 60 rpm until lumps are no longer visually discernable, usually 15-20 minutes.

The coating mixture is applied by any known method of applying a coating of this viscosity. In some embodiments, the coating mixture is applied similarly to a paint, where the mixture is sprayed, rolled or brushed onto the substrate surface. It is also contemplated that a slightly thicker composition be prepared and that the coating mixture be applied with a hawk and trowel or broad knife and bread-pan. If the coating mixture is applied in a manufacturing setting, as where the coating mixture is applied to the substrate panel before it is sent to the retailer, it is contemplated that large-scale commercial equipment be used. Such equipment includes, but is not limited to, sprayers, roll coaters, blade coaters, knife coaters and the like. The coating mixture can be spray applied by machine or hand applied by a paint-knap roller to gypsum paper faced board and/or painted drywall.

Once the primer has dried, a one- or two-coat veneer plaster system or conventional plaster is optionally applied. Elcometer data indicates that when plaster is applied to a substrate panel not intended for plastering, such as SHEETROCK® brand gypsum panels, there is a large standard deviation (6.8) which indicates the presence of uneven plaster adhesion which could lead to early plaster failure. In addition, the data indicates that plaster which is applied to a painted SHEETROCK® brand gypsum panels panel treated with the coating had a relatively low standard deviation (3.3) and a rather high average Elcometer reading of 26.

In a preferred embodiment, the mixture is applied to a thickness of about 5 to about 20 mil wet. This is much thinner than a veneer plaster or joint compound skim coating, but much thicker than a paint primer of about 3-4 mil wet.

Example 1

A resurfacing coating mixture was made with the components and amounts shown in Table I. Preparation began by first dissolving the dual-component set inhibitor in water. ALCOQUEST® 408 polyacrylate polymer, tetrapotassium polyphonic acid compound and the biocide/fungicide package were added to water and fully dissolved with stirring at 60 rpm. The calcium sulfate hemihydrate was added slowly to the aqueous component while mixing at 60 rpm or below. Finally, propylene glycol and the HP 41-803 latex emulsion were added with mixing at 60 rpm. The material was mixed at 60 rpm until lumps were no longer visually discernable, about 15-20 minutes.

TABLE I

Resurfacer Composition

| Component | Weight | Composition |
| --- | --- | --- |
| Calcium sulfate hemihydrate | 1300 grams | 53.4% |
| Water | 600 grams | 24.7% |
| Polymer emulsion, HP 41-803 Vinyl acetate | 400 grams | 16.5% |
| Freeze preventer, Ethylene glycol | 49 grams | 2.0% |
| Glycol Component, Propylene glycol | 50 grams | 2.1% |
| ALCOQUEST ® 408 polyacrylate solution | 18.6 grams | 0.8% |
| Set inhibiting agent, TKPP | 9 grams | 0.4% |
| Biocide package | 2.3 grams | 0.1% |

Example II

A textured coating mixture was prepared from the components of Table II. In this case, sand was added as a texturing material. Preparation began by first dissolving the dual-component set inhibitor in water. ALCOQUEST® 408 polyacrylate polymer, tetrapotassium polyphonic acid compound and the biocide/fungicide package were added to the water and fully dissolved with stirring at 60 rpm. The calcium sulfate hemihydrate was dry blended with the light texturing material for 5 minutes to form a dry mixture. The dry mixture was added slowly to the aqueous component while mixing at 60 rpm or below. Finally, propylene glycol and the HP 41-803 latex emulsion were added with mixing at 60 rpm. The material was mixed at 60 rpm until lumps were no longer visually discernable, about 15-20 minutes.

TABLE II

| Component | Weight | Composition |
| --- | --- | --- |
| Calcium sulfate hemihydrate | 1400 grams | 57.4% |
| Water | 500 grams | 20.5% |
| HP 19-176 polyvinyl acetate copolymer emulsion | 300 grams | 12.3% |
| Medium coarse sand | 102 grams | 4.2% |
| Freeze preventer, Ethylene glycol | 49 grams | 2.0% |
| Glycol component, Propylene glycol | 50 grams | 2.1% |
| ALCOQUEST ® 408 polyacrylate solution | 23.4 grams | 1.0% |
| Set inhibiting agent, TKPP | 9 grams | 0.4% |
| Biocide package | 2.3 grams | 0.1% |

This composition was applied to SHEETROCK® brand gypsum panels and a two-coat veneer plaster was applied to the surface. This textured embodiment allowed the plaster to be applied more easily.

Example III

A coating mixture was made using the components of Table III. This coating mixture included a modified cellulose thickener in addition to an expanded perlite texturizing component. The addition of a small amount of the modified cellulose thickener allowed a significant reduction in the amount of calcium sulfate hemihydrate. Preparation began by first dissolving the thickener in water with high-sheer mixing followed by addition of the dual-component set inhibitor. ALCOQUEST® 408 polyacrylate polymer, tetrapotassium polyphonic acid compound and the biocide/fungicide package were added to water and fully dissolved with stirring at 60 rpm. The calcium sulfate hemihydrate was dry blended with the light texturing material for 5 minutes to form a dry mixture. The dry mixture was added slowly to the aqueous component while mixing at 60 rpm or below. Finally, propylene glycol and the HP 41-803 latex emulsion were added with mixing at 60 rpm. The coating mixture was mixed at 60 rpm until lumps were no longer visually discernable, about 15-20 minutes.

TABLE III

| Component | Weight | Composition |
| --- | --- | --- |
| Calcium sulfate hemihydrate | 1200 grams | 47.4% |
| Water | 600 grams | 23.7% |
| HP 19-176 polyvinyl acetate copolymer emulsion | 500 grams | 19.7% |
| Medium coarse expanded perlite | 102 grams | 4.0% |
| Freeze preventer, Ethylene glycol | 50 grams | 2.0% |
| Glycol Component, Propylene glycol | 49 grams | 1.9% |
| ALCOQUEST ® 408 polyacrylate solution | 18.6 grams | 0.7% |
| Set inhibiting agent, TKPP | 9 grams | 0.4% |
| BERMOCOLL ® E 451 FQ | 3.2 grams | 0.1% |
| Biocide package | 2.3 grams | 0.1% |

This material was applied to SHEETROCK® brand gypsum panels and provided better coverage than other coating mixture compositions. The expanded perlite in the formulation allowed the plaster to be applied more easily.

While a particular embodiment of a coated panel or article made of calcium sulfate hemihydrate has been shown and described, it will be appreciated by those skilled in the art that changes and modifications may be made thereto without departing from the invention in its broader aspects and as set forth in the following claims.

What is claimed is:

1. A method of finishing an interior wall, comprising:
preparing a substrate of panels comprising gypsum, cement or combinations thereof, said substrate having a surface;
applying a primer coating onto the substrate surface, said primer coating comprising 10-40% by weight of a latex emulsion binder, 30-80% by weight calcium sulfate hemihydrate, 0.1-2% by weight of a set inhibiting agent, wherein the set inhibiting agent is selected from the group consisting of tetrasodiumpyrophosphate, tetrapotassiumpyrophosphate, aminotri(methylene-phosphonic acid), diethylenetriamine penta (methylene phosphonic acid) trisodium salt, hexamethylene diamine tetra(methylene phosphonic acid) and mixtures thereof, 0.05-2% of a polymer having a molecular weight less than 6,000 Daltons and 10-40% by weight water; and
optionally applying a one- or two-coat veneer plaster or conventional plaster onto the substrate surface after the primer coating has dried.

2. The method of claim 1 wherein the method further comprises adding to the primer coating an antisedimentation agent.

3. The method of claim 1 wherein the method further comprises adding to the primer coating an organic water retainer.

4. The method of claim 1, wherein the primer coating further comprises a biocide.

5. The method of claim 1, wherein said applying step comprises spraying, brushing or rolling of the coating onto the surface of the substrate.

6. The method of claim 1, wherein the substrate is a wallboard panel.

7. The method of claim 1, wherein a veneer plaster is further applied over the coating.

* * * * *